US009547950B2

(12) United States Patent
Osborne et al.

(10) Patent No.: US 9,547,950 B2
(45) Date of Patent: Jan. 17, 2017

(54) GENERATING A SINGLE AUDIT FILE FROM MULTIPLE SOURCES

(75) Inventors: William M. Osborne, West Chester, PA (US); Carlos Jimenez, Fort Washington, PA (US); Garry M. Knudson, Exton, PA (US)

(73) Assignee: CRANE PAYMENT INNOVATIONS, INC., Malvern, PA (US)

( * ) Notice: Subject to any disclaimer, the term of this patent is extended or adjusted under 35 U.S.C. 154(b) by 790 days.

(21) Appl. No.: 13/640,660

(22) PCT Filed: Apr. 11, 2011

(86) PCT No.: PCT/US2011/031971
§ 371 (c)(1),
(2), (4) Date: May 31, 2013

(87) PCT Pub. No.: WO2011/130177
PCT Pub. Date: Oct. 20, 2011

(65) Prior Publication Data
US 2013/0245820 A1    Sep. 19, 2013

Related U.S. Application Data

(60) Provisional application No. 61/323,282, filed on Apr. 12, 2010.

(51) Int. Cl.
G07F 11/00 (2006.01)
G07F 9/02 (2006.01)
G06F 17/30 (2006.01)

(52) U.S. Cl.
CPC ......... G07F 9/026 (2013.01); G06F 17/30578 (2013.01); G07F 11/002 (2013.01)

(58) Field of Classification Search
None
See application file for complete search history.

(56) References Cited

U.S. PATENT DOCUMENTS 4,369,442 A    1/1983  Werth et al.
4,412,292 A   10/1983  Sedam et al.
(Continued)

FOREIGN PATENT DOCUMENTS

CN    1384459 A    12/2002
EP    0109758 A2    5/1984
(Continued)

OTHER PUBLICATIONS

PCT/US2011/031971 International Search Report dated Jul. 15, 2011.

Primary Examiner — Timothy Waggoner

(57) ABSTRACT

A vending machine audit system includes a vending machine including a vending machine controller configured to generate device data representative of the operations of the vending machine. At least one peripheral device is operatively coupled to the vending machine and is configured to generate device data representative of the operations of the peripheral device. An audit module includes a data storage component and is operatively coupled to the vending machine controller and the at least one peripheral device. The audit module is configured to receive device data from each of the vending machine controller and the at least one peripheral device and to perform a merging operation to generate a single merged audit data record representative of the operations of the vending machine and the at least one peripheral device.

35 Claims, 9 Drawing Sheets

(56) References Cited

U.S. PATENT DOCUMENTS

| | | | |
|---|---|---|---|
| 5,924,081 A | 7/1999 | Ostendorf et al. | |
| 6,339,731 B1 | 1/2002 | Morris et al. | |
| 6,505,095 B1* | 1/2003 | Kolls | 700/244 |
| 6,910,028 B2* | 6/2005 | Chan | G06N 5/022 |
| | | | 706/12 |
| 7,131,575 B1* | 11/2006 | Kolls | 235/379 |
| 7,167,892 B2* | 1/2007 | Defosse et al. | 700/237 |
| 7,353,080 B2* | 4/2008 | Walker et al. | 700/237 |
| 7,535,842 B1* | 5/2009 | Venables | H04L 47/10 |
| | | | 370/230.1 |
| 7,788,239 B2* | 8/2010 | Scholl | G06F 17/30067 |
| | | | 707/695 |
| 7,822,503 B2* | 10/2010 | Merwarth et al. | 700/236 |
| 8,370,423 B2* | 2/2013 | Ozzie | G06F 17/30578 |
| | | | 709/203 |
| 8,533,315 B2* | 9/2013 | Godwin | 700/244 |
| 8,788,341 B1* | 7/2014 | Patel et al. | 700/236 |
| 2002/0016829 A1 | 2/2002 | Defosse | |
| 2003/0220713 A1 | 11/2003 | Owens | |
| 2007/0050465 A1 | 3/2007 | Canter et al. | |

FOREIGN PATENT DOCUMENTS

| | | |
|---|---|---|
| EP | 0986033 A2 | 3/2000 |
| EP | 1367549 A1 | 12/2003 |
| JP | S58114293 A | 7/1983 |
| JP | S59121468 A | 7/1984 |
| WO | WO-9948065 A1 | 9/1999 |
| WO | 00/17791 A1 | 3/2000 |
| WO | 2004/051583 A1 | 6/2004 |

\* cited by examiner

GENERATING A SINGLE AUDIT FILE FROM MULTIPLE SOURCES

This application is the U.S. National Stage filing under 35 U.S.C. 371 of International Application Serial No. PCT/US2011/031971 filed Apr. 11, 2011, which claims priority to U.S. Provisional Application No. 61/323,282 filed Apr. 12, 2010, each of which is incorporated herein by reference in its entirety.

FIELD OF DISCLOSURE

The disclosure relates to processing operational data from a vending machine. In particular, the disclosure relates to combining and processing vending machine operational data from multiple sources within a machine.

BACKGROUND

There have been many solutions proposed for how to generate, store and analyze data from a vending machine. There have also been many proposed solutions to monitoring and controlling multiple remotely located vending machines by using the data generated from vending machines.

For the purposes of the disclosure, a vending machine includes, but is not limited to, a beverage machine, a food/snack machine, a full line vending machine, a kiosk, a drink machine, a ticket terminal, and automated teller machine (ATM), or any other device capable of accepting items of value in exchange for goods or services In a vast majority of the known systems for collecting vending machine data, there is typically a remotely located vending machine having a machine controller, and an audit device for communicating with the vending machine controller to obtain operational data about the machine. Also included in a typical vending machine is a payment device for accepting monies from a consumer. Examples of payment devices include bill acceptors, coin acceptors, credit card readers, debit card readers smart card readers, and even contactless card readers. Typically the tracking of vending machine operation is handled by the vending machine controller and stored in a standard format such as DEX (Data Exchange Interface) data or European Vending Association (EVA)-DTS (Data Transfer Standard) data as commonly recognized in the industry. When the operational data generated by the vending machine is desired to be obtained or reported, an audit module will request (e.g., by polling the Vending Machine Controller (VMC)) the most recent data (or DEX file) from the VMC. In various forms, the audit device is capable of downloading the data file to a service device (e.g., handheld computer or laptop) or if equipped, the audit device can transmit the data to a remote processing facility.

In some machines, such as those without a dedicated audit device, the coin acceptor typically operates to control the cash management functions of a vending machine and thus stores all the data related to such machine activity. In such a vending machine configuration, the VMC also stores other vending data such as items sold, inventory levels, etc. This configuration presents a problem for the operator of the vending machine because in order to obtain all the relevant vending machine operational data, the VMC has to be accessed to obtain the most recent sales and inventory information and then in a separate operation, the payment device (e.g., coin acceptor) has to be accessed to obtain the transactional data (e.g., transaction records, cash levels, available change, etc.) of the vending machine.

In other types of vending machines, the VMC is configured to store the product information and the transaction information. However, even in this configuration there is still certain operational data (e.g., coin tube empty, coin tube jam, banknote recycler empty, etc.) that is stored within a payment device (or vending machine peripheral). The audit devices currently used and known in the art are capable of obtaining the product and transaction information from a single source since this information is available from the vending machine controller. However the additional operational data stored within a peripheral device must be separately audited and thus two or more vending data files or records (e.g., DEX files) will be generated.

SUMMARY

The disclosure relates to single point extraction of vending data from a vending machine. More specifically, in vending machines in which the vending machine controller does not store or record all the operational data of the vending machine, a single module within the vending machine can be configured to obtain all the operational data. In the currently known vending machines, there can be different configurations of a vending machine for how, where, and what data is recorded relating to the operation of the vending machine. In configurations, where the vending machine controller is only configured to store product type data (e.g., inventory levels, number of product sold or dispensed, etc.). another device (typically the coin acceptor) is configured to store all the cash related data (e.g., change levels, cash received, cash dispensed, etc.). In such a configuration, an audit module can be added to the vending machine to obtain the product information from the vending machine controller and the cash data from the payment device (e.g., coin acceptor).

In an implementation, the audit module can be operatively coupled with a local area network (LAN) module for communicating vending data to a portable computing device or other audit modules located within or connected to the local area network. The audit module can be operatively coupled with a wide area network (WAN) module for communicating with a remotely located computing device for communicating vending data. Examples of a Local Area Network (LAN) include, but are not limited to, Bluetooth communications, wire line networks, personal area network (PAN), radio, or any other short range communication network either wired or wireless for transmitting data between at least two devices within the network. Examples of a Wide Area Network (WAN) include, but are not limited to, CDMA, 3G, 4G, cellular, telephone line, wire line networks, or any other wired or wireless network capable of providing communications between at least two remotely located device.

In some configurations, the audit module (or its functionality) is integrated into a device within the vending machine. For example, the audit module can be integrated into a coin mechanism, vending machine controller, a bill mechanism, a bill recycler (a type of bill mechanism which can also dispense bills to a user), a card reader, or any other device connected to the vending machine.

DETAILED DESCRIPTION OF THE DISCLOSURE

Various aspects of the disclosure are set forth in the claims, description and drawings.

The disclosure relates to a vending audit system and method for consolidating audit data into one file from multiple sources within a vending machine 10. Specifically, an audit module 100 can be integrated into vending machine 10 to obtain device data from at least two different source and combine this device date into a single record.

Figure 1:
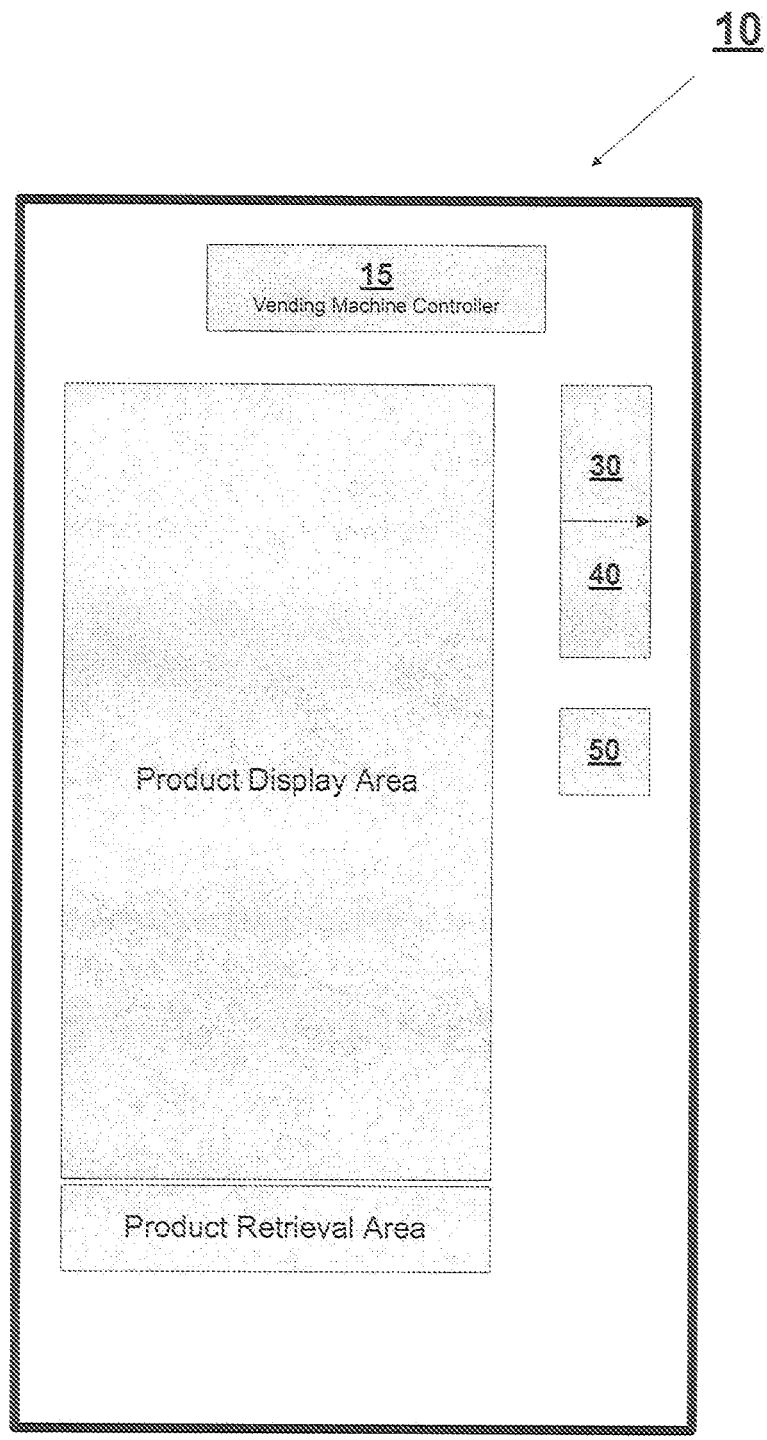
FIG. 1 illustrates an example of a vending machine.
Figure 2:
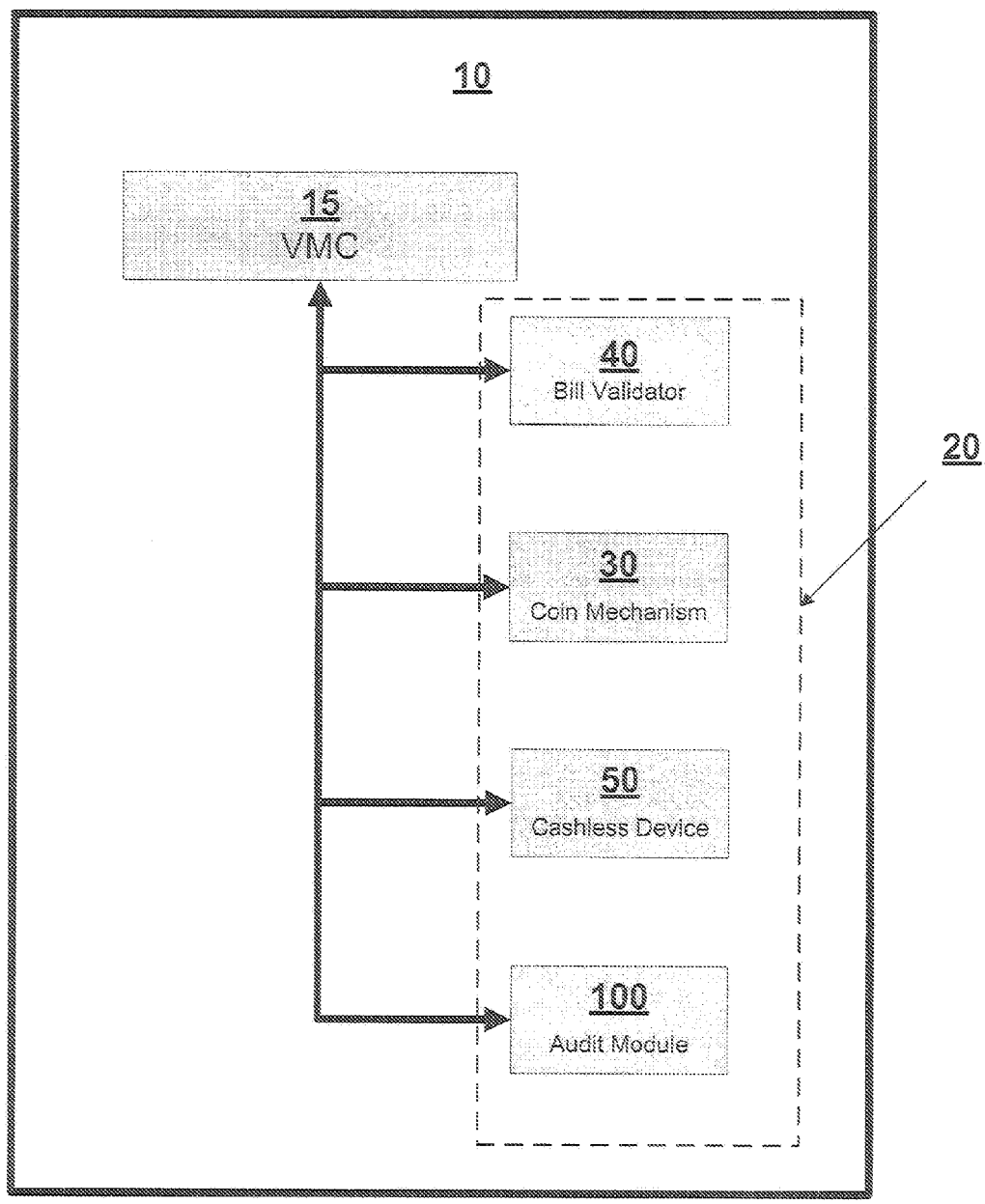
FIG. 2 illustrates multiple devices operatively connected within a vending machine.

In some implementations, vending machine 10 includes a vending machine controller 15 and at least one payment device 20 (e.g., a coin mechanism 30, a bill mechanism 40, a card reader 50, etc.) as shown in FIG. 1. In an implementation, audit module 100 is integrated into a coin mechanism 30. In some implementations, audit module 100 can be a stand-alone or a separate device coupled to vending machine 10. Vending machine 10 can be configured to have electrical connections between vending machine controller 15, coin mechanism 30, bill mechanism 40, cashless device 50, and audit module 100 as shown in FIG. 2. In some implementations, the communications protocol between vending machine controller 15 and peripheral devices 20 (e.g., coin mechanism 30) is a standard protocol as commonly known in the arts (e.g., MDB, BDV, Executive, etc.).

Vending machine controller 15 can be configured to control the operations of vending machine 10 including, but not limited to, dispensing product, storing product inventory levels, and stored product dispensing records. Peripheral devices 20 can be configured to control the operations thereof and record transaction and/or operational information, respectively. In an exemplary implementation, peripheral device 20 can be a coin mechanism 30. Coin mechanism 30 can be configured to discriminate inserted coins or tokens as known in the arts, and can be configured to keep transaction records related to monies accepted, coin storage levels, monies dispensed, and operational data. Audit data stored in coin mechanism 30 can include, but is not limited to, coins accepted, coins rejected, coin tube storage levels, and coin mechanism jam information.

In some implementations, vending machine 10 can include multiple peripheral devices 20. For example, vending machine 10 can include coin mechanism 30, a bill mechanism 40, and a cashless card reader 50 as shown in FIG. 2. In such exemplary implementations, each of the peripheral payment devices 20 communicate with vending machine controller 15 to provide accepted monies and dispensed monies information as required by the type of vending machine controller 15. In other configurations each of the peripheral payment devices 20 keeps records of transactional data related to its respective operation.

Figure 3:
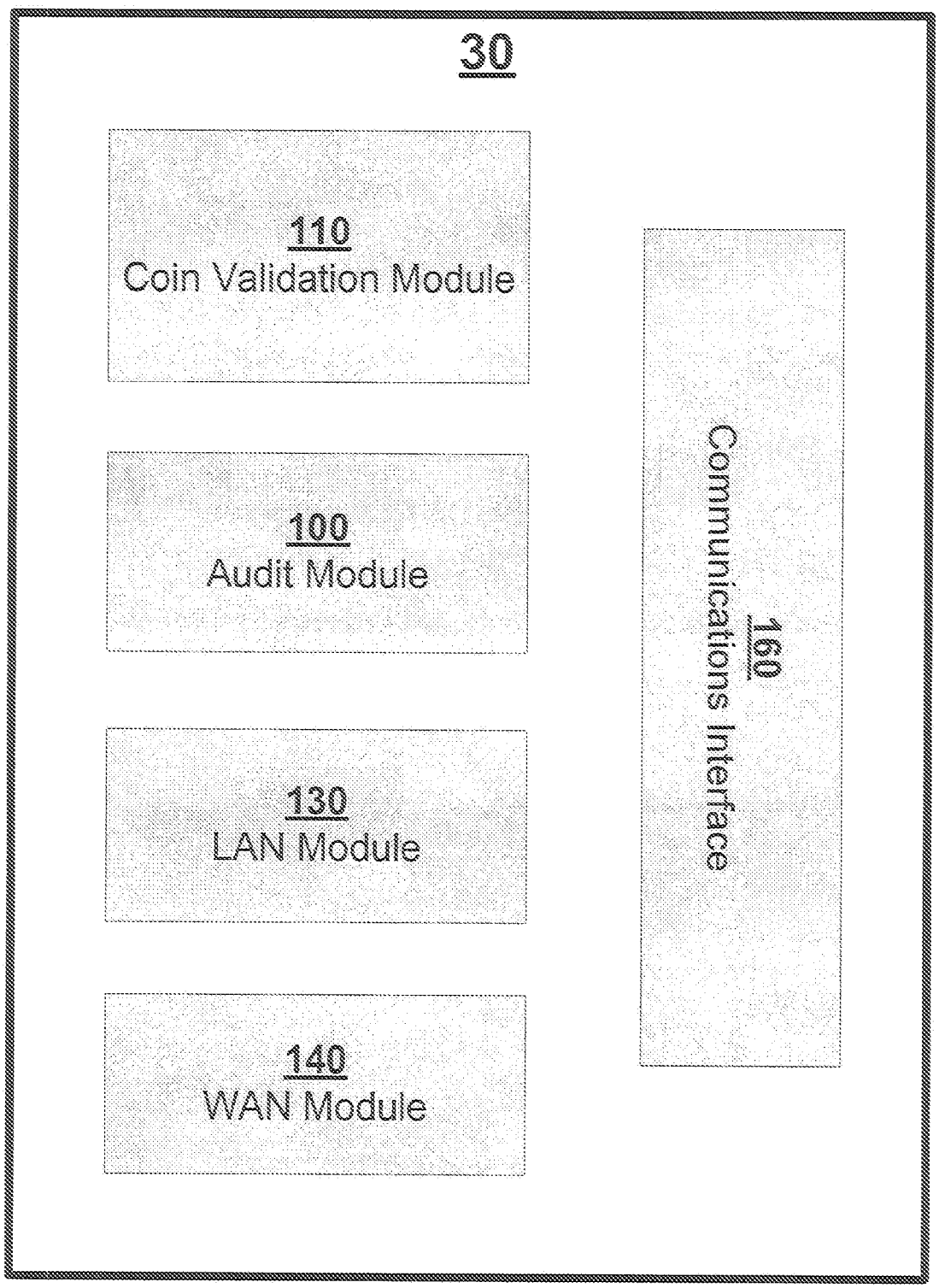
FIG. 3 illustrates an example of a peripheral device (e.g., a coin mechanism).
Figure 4:
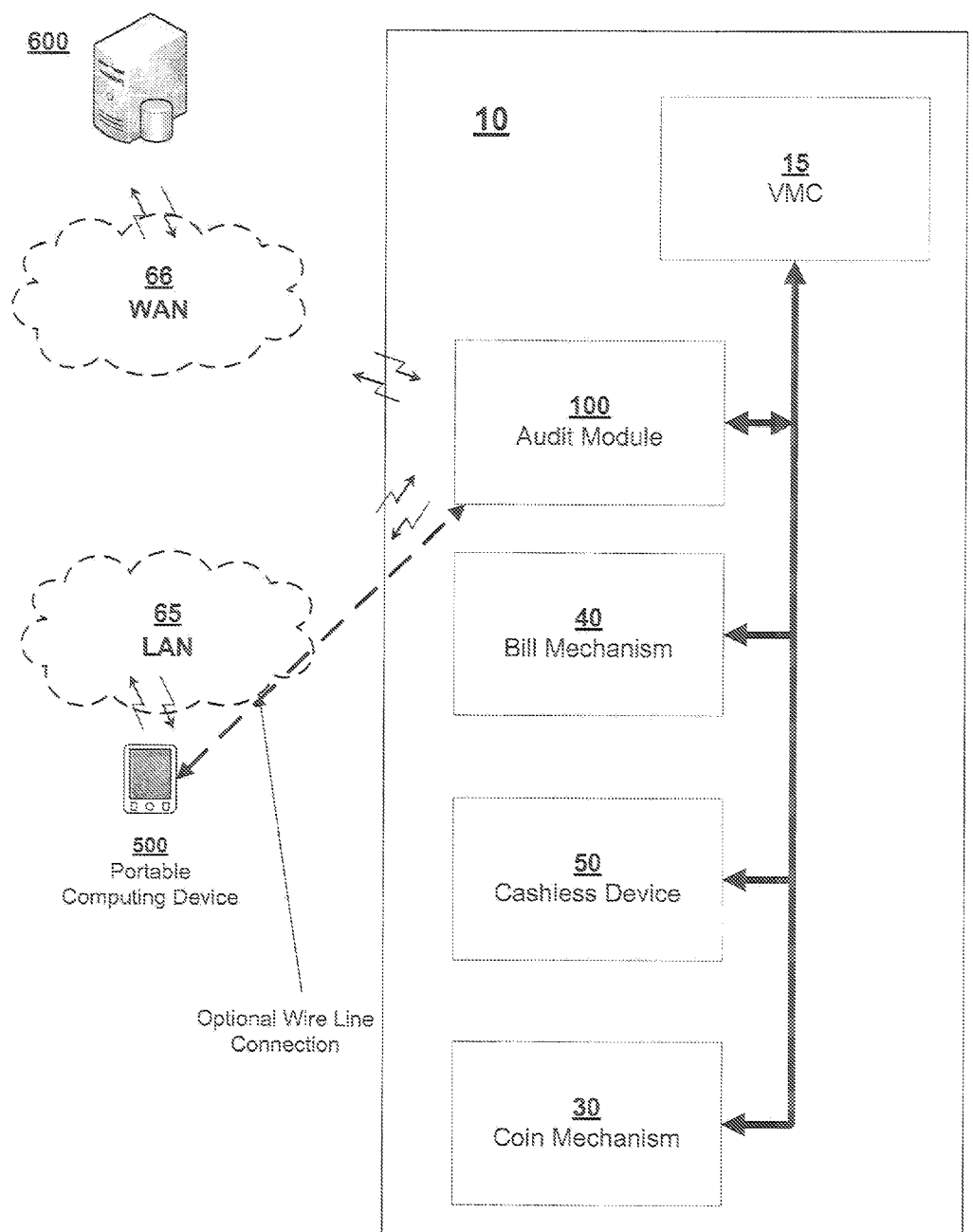
FIG. 4 illustrates a vending machine having various devices connected thereto, in communication with device located outside the vending machine.
Figure 9:
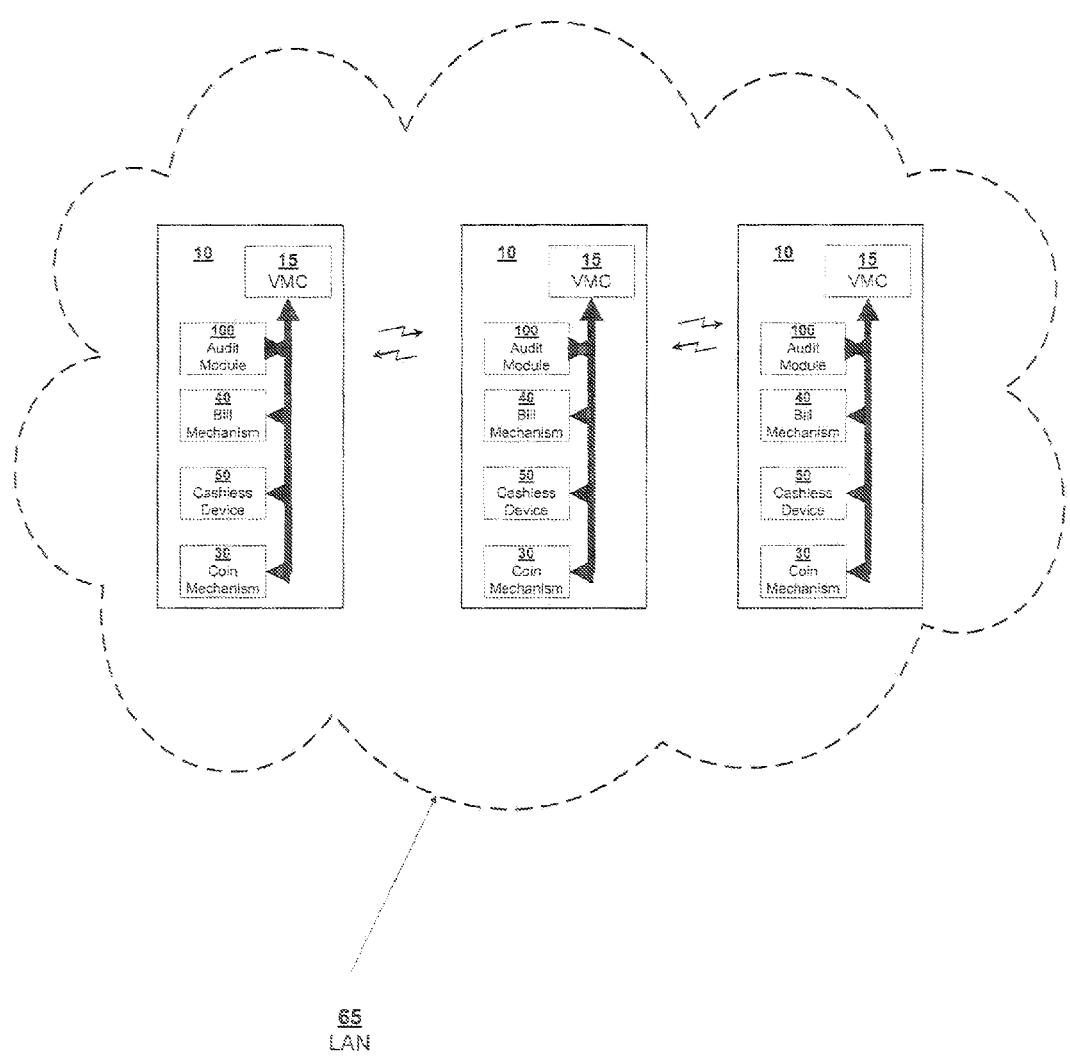
FIG. 9 illustrates a further implementation of a system with an audit module.

In an implementation, coin mechanism 30 can be configured to include a coin validation module 110, an audit module 100, a local area network (LAN) module 130, a wide area network (WAN) module 140, and a communications interface 160 (FIG. 3). Coin validation module 110 can be a component of coin mechanism 30 configured to evaluate coins or tokens inserted into vending machine 10, and to determine their respective acceptability. The various details of coin validation are known in the art, and the details of the function of coin validation 110 are not the subject of the current disclosure. Audit module 100 can be a component of coin mechanism 30 and can be configured to obtain vending machine operational (i.e., device data) and transactional information (i.e., device data) from at least two sources (e.g., VMC 15, coin mechanism 30, bill mechanism 40, and cashless device 50, or any other peripheral device 20.). LAN module 130 can be a component of coin mechanism 30 and configured to communication with a portable computing device 500 (as shown in FIG. 4) or other audit modules 100 located within other vending machines 10 within a local area network (LAN) 65 as shown in FIG. 9. WAN module 140 can be a component of coin mechanism 30 and configured to communicate with at least one remotely located computing device 600 over a wide area network (WAN) 66 as shown in FIG. 4. Communications interface 160 can be a component of coin mechanism 30 and configured to allow communications between coin mechanism (and thus audit module 100) and other devices (e.g., VMC 15, and/or payment peripherals 20) electrically connected within vending machine 10.

Figure 7:
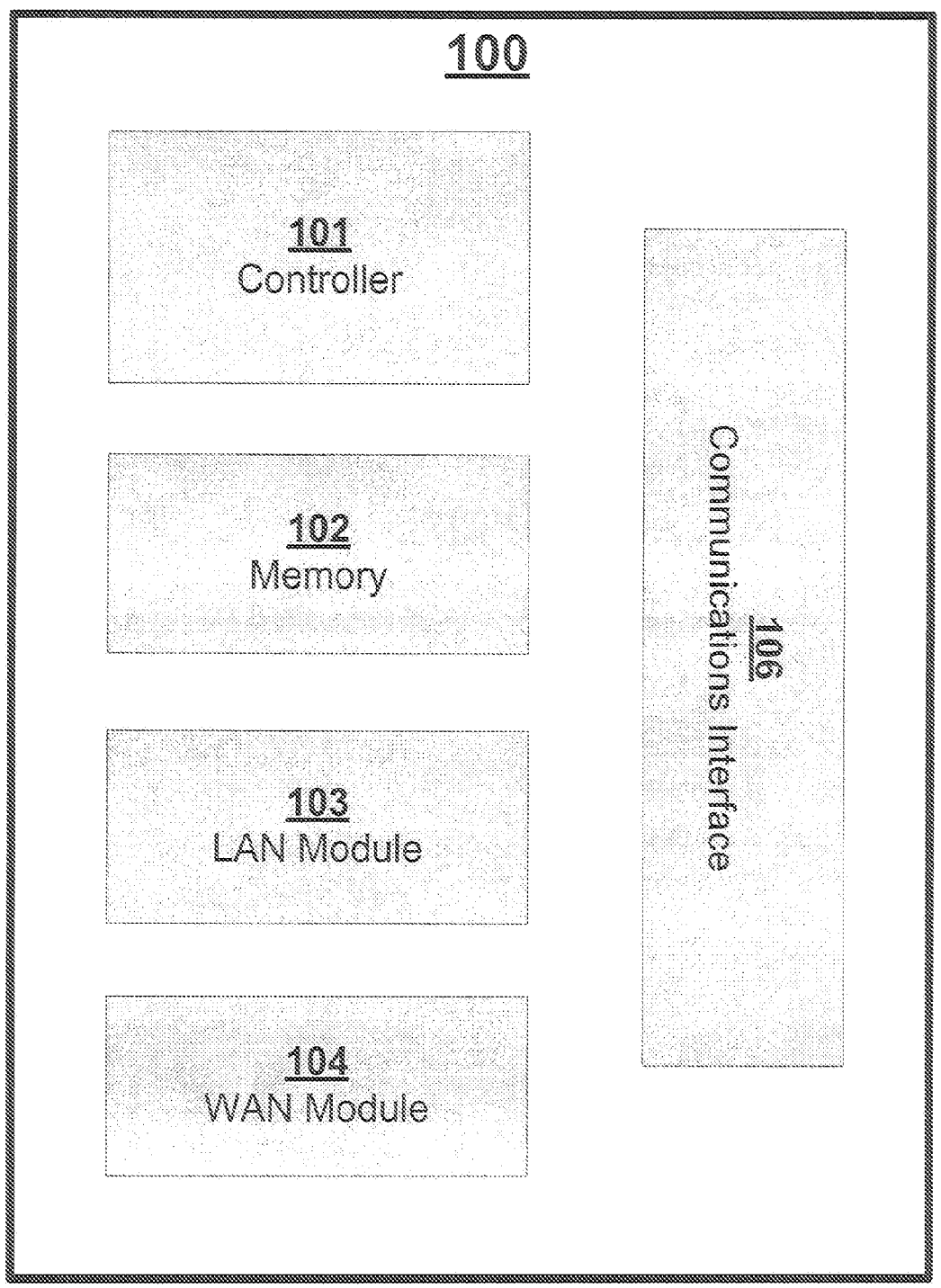
FIG. 7 illustrates an example of an audit module.

FIG. 7 shows an implementation of audit module 100 as a separate device operatively coupled to vending machine 10 and other device (e.g., VMC 15, coin mechanism 30, bill mechanism 40, and cashless device 50). Audit module 100 can include a controller 101 configured to control the overall operation of audit module 100, a memory unit 102 for storing various data and programming associated with audit module 100, LAN module 103 for operatively coupling audit module 100 to a local area network 65, WAN module 104 for operatively coupling audit module 100 to a wide area network 66, and communication interface 160 for operatively coupling audit module 100 to at least VMC 15 and one other peripheral device 20 (e.g., coin mechanism 30, bill mechanism 40, or cashless device 50). Audit module 100 can be integrated into any of the peripheral device 20 or VMC 15 without varying in scope from the current disclosure. Examples of a Local Area Network (LAN) include, but are not limited to, Bluetooth communications, wire line networks, personal area network (PAN), radio, or any other short range communication network either wired or wireless for transmitting data between at least two devices within the network. Examples of a Wide Area Network (WAN) include, but are not limited to, CDMA, 3G, 4G, paging network, cellular network, telephone line or network, wire line networks, or any other wired or wireless network capable of providing communications between at least two remotely located device.

Audit module 100, either as a separate device or integrated into a peripheral device 20, can be configured to be wire line connected to a portable computing device 500 (e.g., a handheld device) for extraction of a single merged audit record as described in the current disclosure. Examples of such a wire line connection include, but are not limited to, a DEX jack, USB connection, or any other type of connection capable of being used to communicate with audit module 100.

In an implementation, audit module 100 is configured to obtain audit data from at least two sources within vending machine 10. For example, audit module 100, via communications interface 160, can obtain vending machine operational data from connected devices 20 (and VMC 15) within vending machine 10 in the form of DEX data (or EVA-DTS data) files. In an implementation where vending machine 10 is equipped only with a coin mechanism 30 as a payment device, audit module 100 individually obtains a data file from VMC 15, and coin mechanism 30. In some configurations, VMC 15 provides audit module 100 with operational data (product inventory, number of products dispensed, etc.) of vending machine 10, while coin mechanism 30 provides transactional data (e.g., monies received, monies dispensed, change availability, etc.). Once audit module 100 has received data from both VMC 15 and coin mechanism 30, audit module 100, executes programming to process the independently received data files. The processing of vending data files (e.g., operational data and transactional data) by audit module 100 will be described in further detail below. In some implementations, audit module 100 obtains operational and transactional data files from multiple sources, including, but not limited to, a coin mechanism, a VMC, a bill mechanism, a card reader, a cashless device, or any other peripheral device in communication with the vending machine.

Figure 5:
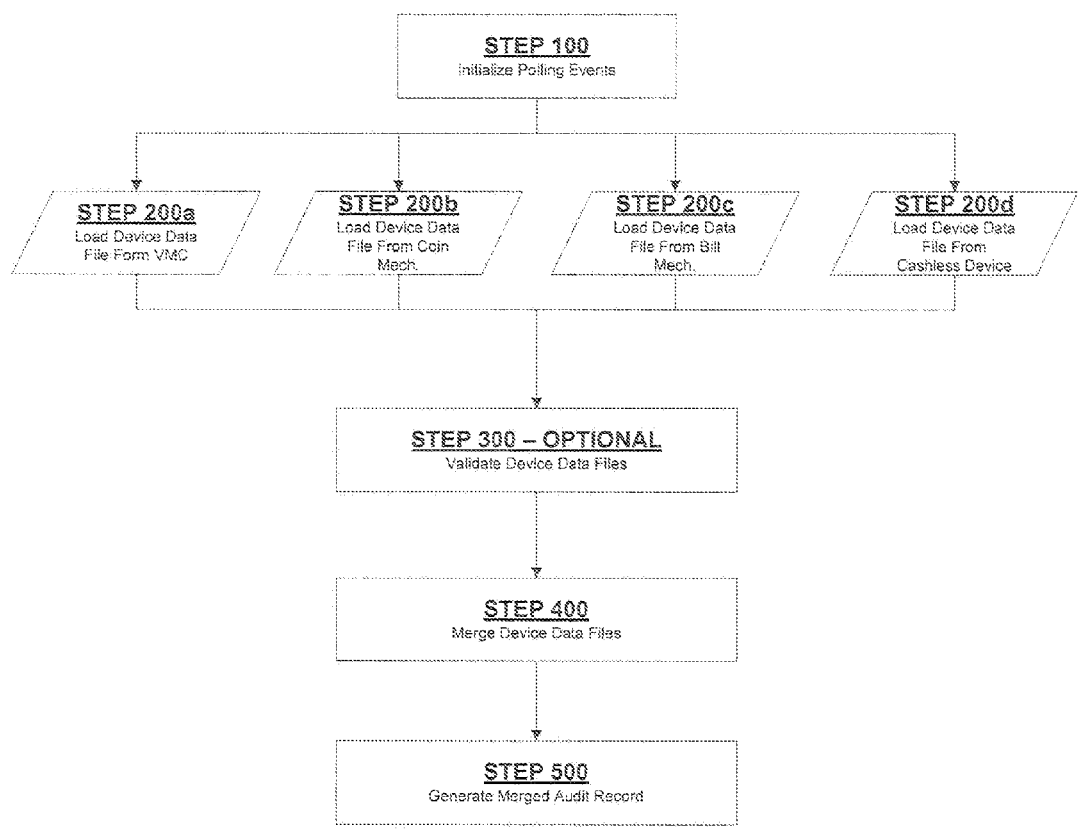
FIG. 5 illustrates a series of operations that can be performed by an audit module.

The operation of how audit module 100 processes multiple vending machine data from multiple sources will now be described. FIG. 5 shows a multi-step process of how audit module 100 processes multiple vending data files so as to generate a single audit record indicative of the operation of vending machine 10 since the last such file was generated. Step 100 depicts the activity of audit module 100 obtaining device data files (i.e., vending data) from multiple sources within vending machine 10. In an implementation, audit module 100 polls each of the associated devices 20 within a vending machine according to a standard protocol. In other, configurations of vending machine 10, audit module 100 obtains device data files from multiple devices by means other than a polling event.

To handle multiple peripheral devices 20 (and VMC 15) connected to vending machine 10, audit module 100 can perform the operation of loading a respective device data file as depicted in steps 200a, 200b, 200c, and 200d. Since audit module 100 can be configured to process at least two device data files from at least two devices as sources, the exact number of 200x operations performed can vary.

Referring to the example of FIG. 5, audit module 100 at step 200a loads a device data file from VMC 15, at step 200b audit module 100 loads a device data file from coin mechanism 30, at step 200c audit module 100 loads a device data file from bill mechanism 40, and at step 200d audit module 100 loads a device data file from cashless device 50. Each of the respective device data files loaded into audit module 100 can be retained within audit module 100 in a data storage device or component 101 such as an EEPROM, or other memory storage component. Once all the respective device data files the multiple devices have been loaded for use by audit module 100, operation can optionally proceed to step 300 to validate each device data file. An example of validation of a device data file can include an evaluation of a check sum operation, or any other validity check. Once the respective device data files have been optionally validated in step 300, audit module 100 performs an operation at step 400 to begin merging each of the device data files into one file. Details of how multiple audit files can be merged is described in greater detail below. Once the device data files have been merged in step 400, audit module 100 generates a merged audit record in step 500.

As previously described, audit module 100 is configured to load into memory at least two device data files from at least two different devices (e.g., Step 200). Each device data file contains at least a data record section in which multiple data fields are populated. As an optional Step 300, each of the device data files can be validated, (e.g., by using an embedded checksum). Each data field can be identified by a group identifier, so as to identify the type of data populated in that respective field. For example, Table 1 shows various different groups potentially contained in a data record.

TABLE 1

| AM | Audit Module Group |
|----|--------------------|
| BA | Bill Acceptor Group |
| CA | Cash Group |
| CB | Control Board Group |
| DA | Cashless 1 Group |
| DB | Cashless 2 Group |
| EA | Event Group |
| HA | Hopper 1 Group |
| HB | Hopper 2 Group |
| ID | ID Group |
| LA | Price List Group |
| MA | Machine Group |
| MR | Metered Read Group |
| PA | Product Group |
| PP | Preselection group |
| SA | Stock Item Group |
| SD | Password Group |
| TA | Token Acceptor Group |
| VA | Value Group |

As audit module 100 performs the operation of merging the at least two device data files [shown as step 400 in FIG. 5], each device data file steps through each data group. Simultaneously, a reference table [shown in Table 2] stored within audit module 100 is used to determine how the data between each device data file will be managed according to a predetermined relationship for a given data group. For example, in some cases only VMC 15 device data is retained in the merged record and in some cases both the VMC and at least one peripheral device data (e.g., coin mechanism 30 data) are retained in the merged audit record. Table 2 shows an example reference table stored within audit module 100 as used for a vending machine having device data files only from VMC 15 and coin mechanism 30. However any number of other devices could be included to have a predetermined relationship as to data groups.

TABLE 2

| NONE | DON'T INCLUDE THIS GROUP IN MERGED OUTPUT FILE |
|------|-----------------------------------------------|
| VMCONLY | INCLUDE ONLY IF IN THE VMC AUDIT FILE |
| CMONLY | INCLUDE ONLY IF IN THE COIN MECHANISM AUDIT FILE |
| VMCPRIORITY | IF IN BOTH AUDIT FILES, THE VMC AUDIT FILE HAS PRIORITY |
| CMPRIORITY | IF IN BOTH AUDIT FILES, THE COIN MECHANISM HAS PRIORITY |
| BOTH | DATA IS INCLUDED FROM BOTH AUDIT FILES |
| INTERNAL | DATA IS GENERATED INTERNALLY |

As audit module 100 performs the operation of Step 400, each data field may be transferred (e.g., copied) to the merged audit record according to a predetermined relationship for the data field particular group as defined in a table such as Table 2. Such a reference table, as exemplified in Table 2, allows audit module 100 to determine which data fields are combined and in some scenarios can determine if a particular device data has priority over another device. For example, the reference table stored in audit module 100 may be configured so that only cash data from a specific peripheral device 20 (e.g., coin mechanism 30) will be transferred to the merged audit record and the similar data field from another device (e.g., VMC 15) will be discarded. In other scenarios it may be important to transfer both data fields to the merged record, for example from both VMC 15 and coin mechanism 30.

The use of a reference table, such as that depicted in Table 2, allows for the merging of multiple device data files by audit module 100 so as to control which device data is duplicated and which device data is not duplicated. Such a configuration also allows the merged audit data record to further contain device data that one device may contain, but other devices may not contain. For example, VMC 15 may not be configured to store or record certain fault data (e.g., jam, or other mechanism malfunctions), while the specific peripheral device 20 may record such information. In the merged audit data record, this information can be extracted by amending (i.e., adding) such data fields. In previous known systems, such information could only be obtained by obtaining audit record from both VMC 15 and peripheral device 20 (e.g., coin mechanism 30).

In some implementations, device data files can contain two distinct types of data. A first type of data relates to a total value since vending machine 10 was commissioned. For example, a data field relating to $1 coins received would be a total of all 1$ coins received since the machine was commissioned. A second type of data relates to interim data (i.e., the total value since the last device data file was generated). For example, a data field relating to 1$ coins received, would contain the total number of 1$ coins received since the last time a device data file was generated. In some configurations of vending machine 10, interim data fields in a device are reset after each device data file is generated.

There exists a potential problem with merging audit data records, for example when VMC 15 and coin mechanism 30 are audited by audit module 100, the interim data values will be reset. In this condition, if the transferring of the merged audit record by remote processing facility 600 or by a portable computing device 500 fails for any reason the complete audit process may need to be repeated. In such a scenario, the interim values stored in VMC 15 and coin mechanism 20 in the newly generated device data files will be incorrect. In an implementation, audit module 100 can be configured to retain a merged audit record in memory. A merged audit record can further be flagged or otherwise identified so as to differentiate it from future merged audit records.

In some implementations, audit module 100 is configured to retain a merged audit record in memory and associate it to a predefined validity period (e.g., 15 minutes, or event triggered) before being invalidated by audit module 100. During the validity period, audit module 100 can monitor the communication between devices within vending machine 10 such that if any event which would alter the accuracy of any of the device audit record occurs, audit module 100 can be configured to invalidate the merged audit record. Once audit module 100 has invalidated the merged audit record, new VMC 15 and coin mechanism 30 (or multiple peripheral device 20) device data files need to be loaded into audit module 100, and a new merging operation (as shown in step 400) can be executed to generate a new merged audit record. The new merged audit record can be a combination of new device data files and the previously stored device data files. Other configurations for audit module 100 can be implemented as will be described in relation to FIG. 8.

Figure 6:
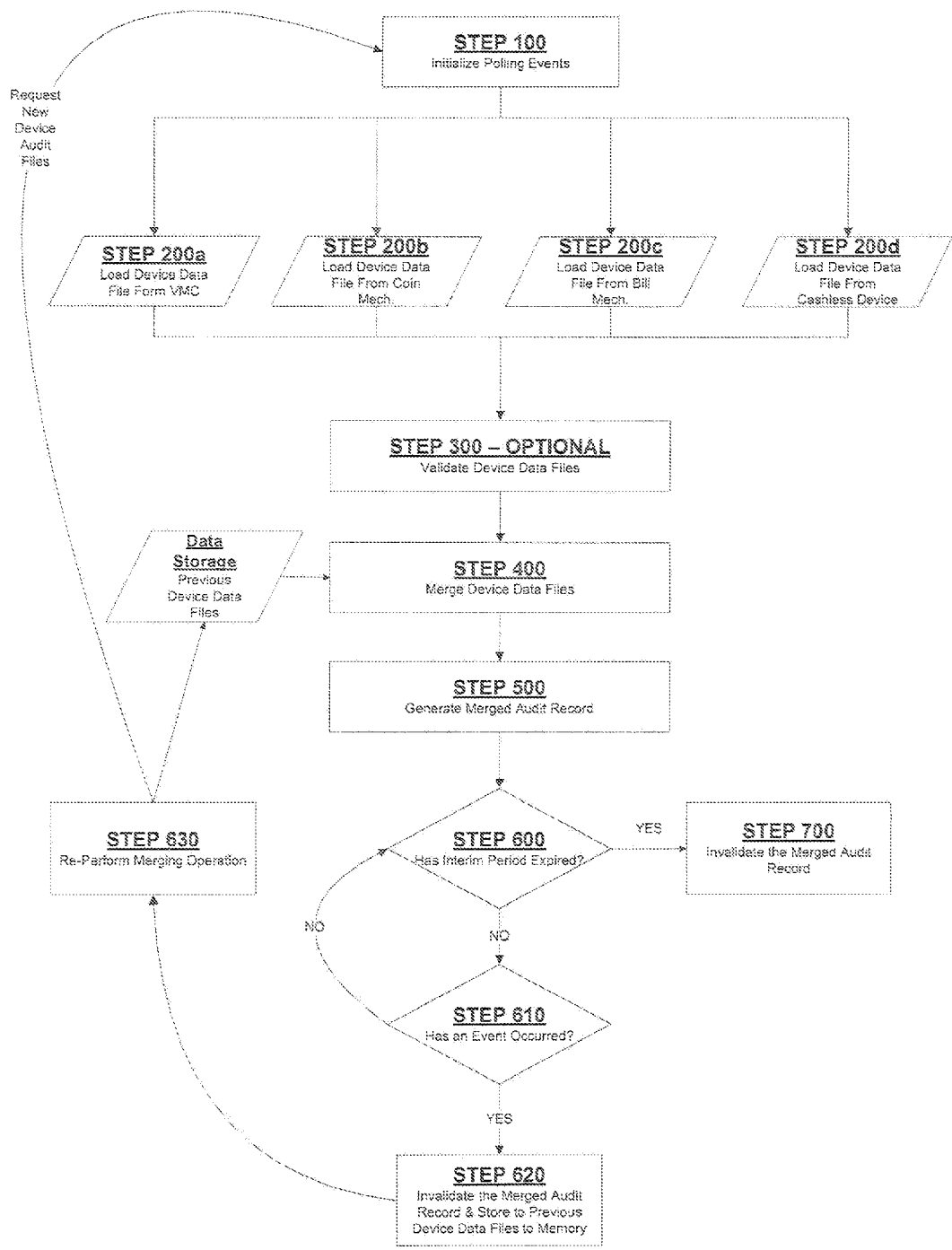
FIG. 6 illustrates a series of operations that can be performed by an audit module.

FIG. 6 depicts operations performed by audit module 100 when configured to associate a predefined validity period for a merged audit record, as well as how to ensure accuracy if an event in vending machine 10 occurs during a validity period. The steps to generate an initial merged audit record are similar to those described in conjunction with FIG. 5. However, once a merged audit record has been generated, audit module 100 enters an interim period operation at Step 600. During the operation of Step 600, audit module 100 monitors activity of the vending machine and the respective peripheral devices 20 for any activity which may change the accuracy of the merged audit record until the expiration of the interim period as depicted by the continual loop of Steps 600 and 610. Audit module 100 performs an invalidation of the merged audit record at Step 700 upon the expiry of the predefined interim period. If during the interim period audit module 100 detects an event at Step 610, audit module 100 performs the operation of Step 620 and invalidates the merged audit record and stores the previous device data files in memory. Once Step 620 has been performed by audit module 100, Step 630 is performed to execute a re-merging operation and each of the respective devices (e.g., VMC 15 and coin mechanism 30) initialized for loading new device data files. As in the original merging operation, each of the new device data files are loaded into audit module 100 at Steps 200*a* and Step 200*b*, optionally validated at Step 300, and then merged with each of the previously stored device data files stored in memory at Step 400 and Step 500. This process can be repeated until there is a successful expiration of the merged audit record interim period signally a successful transfer of a merged audit file to a portable computing device 500 or remote processing facility 600.

Figure 8:
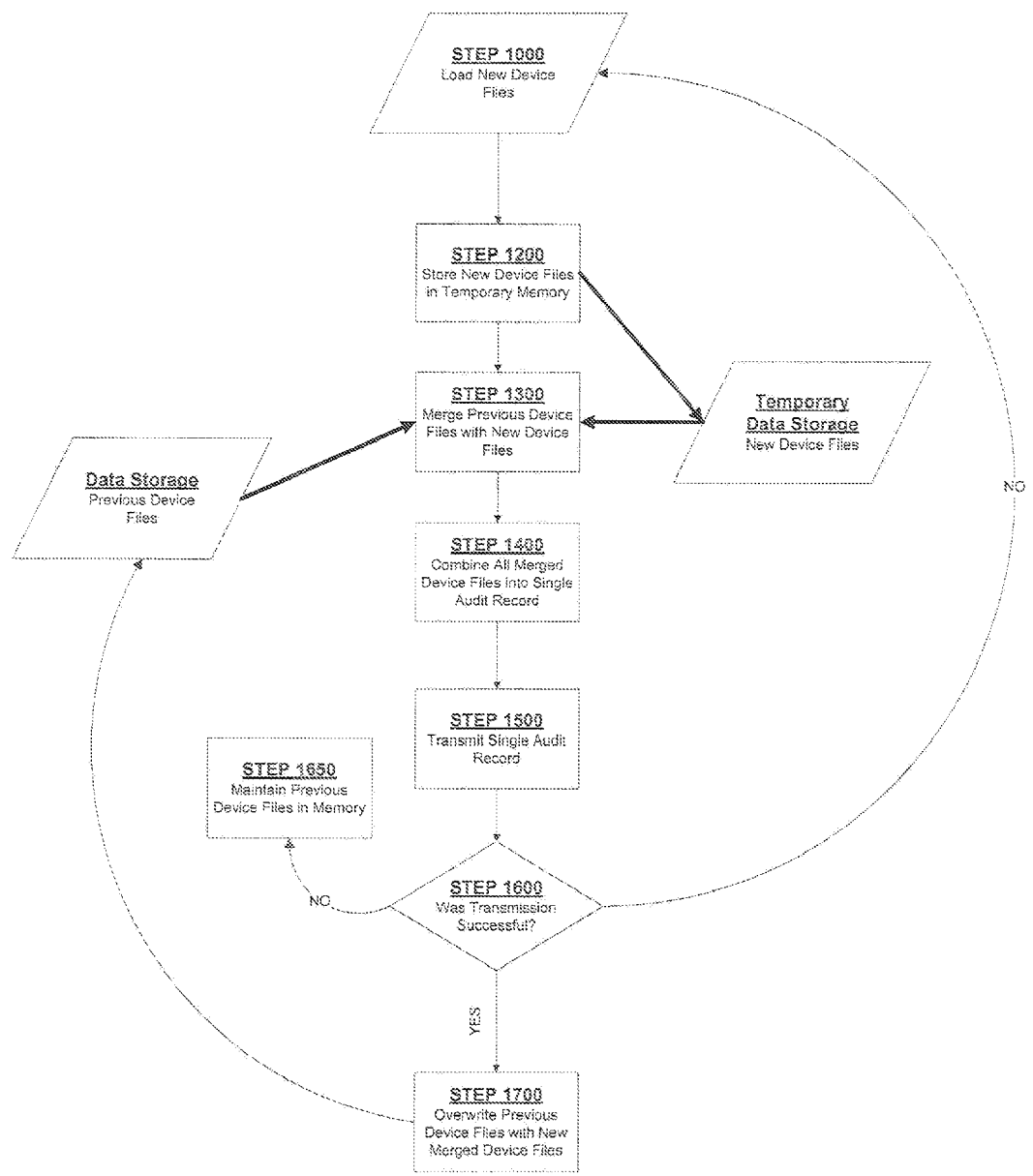
FIG. 8 illustrates a series of operations that can be performed by an audit module.

FIG. 8 depicts a series of operations of audit module 100 to merge device data from at least two sources into a single merged audit record in an implementation of the disclosure. A step 1000, audit module 100 loads at least two new device data files. Each of these at least two device data files can be stored in a temporary memory location for future use, as depicted in step 1200. At step 1300, audit module 100 access stored both previously stored device data files and newly loaded device data files and begins the operation of merging each of the previously stored device data file and the newly loaded device data file into one merged device data file. At step 1400, audit module merges all merged device data files into a single merged audit record. Upon a prompt from an external device (e.g., portable computing device 500 or remote computing device 600) or based on instructions internal to audit module 100, audit module initiates transmission of the newly merged audit record. Transmission of the merged audit record can be executed using WAN 66, LAN 65, or by physically coupling a computing or portable memory device to audit module 100.

At step 1600 audit module checks to confirm that the transmission of the merged audit record was successful. If the transmission by audit module 100 failed for any reason, audit module 100 retains the previous device data files in memory (as shown at step 1650) and returns to the operations of step 1000. As previously described, the interim data in the newly loaded data files will not be inaccurate. Since the device data files contain the total value since the machine was commissioned, new accurate interim data values can be calculated using the previous device data files and the new device data files. If at step 1600 audit module 100 confirms that the transmission of the merged audit record was successful, the operations of step 1700 are performed and the newly merged device files are stored in memory in place of the previous device data files. The exemplary set of operations shown in FIG. 8 are performed by audit module 100 any time it is desired to obtain up to date vending operational data from vending machine 10. As previously described, this can be at the request of an external device (e.g., due to a service visit or request) or it audit module 100 may be configured to periodically update the stored device data files.

Other implementations are within the scope of the claims.

What is claimed is:

1. A vending machine audit system comprising:
   a vending machine including a vending machine controller configured to generate device data representative of operations of the vending machine;
   at least one peripheral device operatively coupled to the vending machine and configured to generate device data representative of operations of the peripheral device; and
   an audit module including a data storage component and operatively coupled to the vending machine controller and the at least one peripheral device;
   wherein the audit module is configured to receive device data from each of the vending machine controller and the at least one peripheral device and to perform a merging operation to generate a single merged audit data record representative of the operations of the vending machine and the at least one peripheral device,
   wherein the audit module is configured to comprise a reference table stored in memory defining a priority between a priority of data groups, a priority of the vending machine controller, and a priority of the at least one peripheral device,
   wherein the audit module is configured to enter an interim period in response to generation of the single merged audit data record, and
   wherein the audit module is configured to invalidate the single merged audit data record in response to detecting an event that changes an accuracy of the single merged audit data record during the interim period.

2. The vending machine audit system according to claim 1, wherein the vending machine includes a communications standard communication protocol used by the vending machine controller, the at least one peripheral device, and the audit module to communicate there between.

3. The vending machine audit system according to claim 2, wherein the audit module is configured to receive device data from the vending machine controller and the at least one peripheral device using the standard communications protocol.

4. The vending machine audit system according to claim 3, wherein the standard communications protocol is a Multi-Drop-Bus communications protocol.

5. The vending machine audit system according to claim 3, wherein the standard communications protocol is Executive.

6. The vending machine audit system according to claim 3, wherein the standard communications protocol is BDV.

7. The vending machine audit system according to claim 1, wherein the device data from the vending machine controller and the at least one peripheral device includes a data record section.

8. The vending machine audit system according to claim 7, wherein the data record section includes data fields identifiable by a data group identifier.

9. The vending machine audit system according to claim 8, wherein the data record section includes a total value and an interim value.

10. The vending machine audit system according to claim 9, wherein the generation of the merged device data is a result of the audit module writing the total value from the new device data and an interim data as a difference between the interim value of the new device data and the interim value of the previously stored device interim value.

11. The vending machine audit system according to claim 7, wherein the reference table stored in memory further defines a set of predetermined relationships between data groups, the vending machine controller, and the at least one peripheral device.

12. The vending machine audit system according to claim 1, wherein the audit module is configured to store previous device data in memory.

13. The vending machine audit system according to claim 1, wherein the merging operation comprises:
   the audit module loading new device data from the vending machine controller and the at least one peripheral device,
   accessing previously stored device data from memory,
   comparing each data field in the respective new device data and previously stored device data, and
   writing to a merged device data based on a comparison of the previously stored device data and the new device data.

14. The vending machine audit system according to claim 1, wherein the at least one peripheral device is a payment device.

15. The vending machine audit system according to claim 14, wherein the payment device is at least one of a coin mechanism, a bill mechanism, or a cashless device.

16. The vending machine audit system according to claim 15, wherein the bill mechanism is a bill validator.

17. The vending machine audit system according to claim 16, wherein the bill mechanism is a bill recycler.

18. The vending machine audit system according to claim 1, wherein the audit module is integrated into the at least one peripheral device.

19. The vending machine audit system according to claim 1, wherein the audit module is a separate device from the at least one peripheral device.

20. The vending machine audit system according to claim 1, wherein the audit device further includes a local area network (LAN) module.

21. The vending machine audit system according to claim 20, wherein the LAN module is configured to support communications between the audit module and a portable computing device.

22. The vending machine audit system according to claim 21, wherein the portable computing device is a handheld device.

23. The vending machine audit system according to claim 1, wherein the audit module further includes a wide area network (WAN) module.

24. The vending machine audit system according to claim 23, wherein the WAN module is configured to support communications between the audit module and a remotely located computing device.

25. The vending machine audit system according to claim 1, wherein the audit module is configured to transfer a merged audit record to a portable computing device.

26. The vending machine audit system according to claim 1, wherein the audit module is configured to transfer a merged audit record to a remotely located computing device.

27. The vending machine audit system according to claim 1, wherein the audit module is configured for wire line connection with a portable computing device.

28. The vending machine audit system according to claim 27, wherein the wire line connection is a DEX connection.

29. The vending machine audit system according to claim 27, wherein the wire line connection is an EVA-DTS connection.

30. The vending machine audit system according to claim 27, wherein the wire line connection is a USB connection.

31. The vending machine audit system according to claim 30, wherein the audit module is configured to transfer the merged audit record to a memory device capable of using the USB connection.

32. The vending machine audit system according to claim 1, wherein the audit module further includes a communications interface.

33. The vending machine audit system according to claim 32, wherein the communications interface enables the audit module to communicate with the vending machine controller and the at least one peripheral device.

34. A method for generating a single audit record from at least two sources within a vending machine, the method comprising:
   operating an audit module to communicate with a vending machine controller of a vending machine, the audit module requesting device data from the vending machine controller;
   transferring the device data from the vending machine controller to the audit module, the audit module storing the device data from the vending machine controller in memory;
   operating an audit module to communicate with at least one peripheral device within the vending machine; and
   transferring the device data from the at least one peripheral device to the audit module, the audit module storing the device data from the at least one peripheral device in memory;
   generating, by the audit device, a single audit record indicative of operations of the vending machine using the device data from the vending machine controller, the device data from the at least one peripheral device, and previously stored device data for the vending machine controller and the at least one peripheral device, and
   wherein the audit module is configured to comprise a reference table stored in memory defining a priority between a priority of data groups, a priority of the vending machine controller, and a priority of the at least one peripheral device,
   entering an interim period in response to generation of the single audit record, and
   invalidating the single audit record in response to detecting an event that changes an accuracy of the single audit record during the interim period.

35. A method for generating a single merged audit record from at least two sources within a vending machine comprising:
   generating new device data from a vending machine controller of the vending machine;
   generating new device data from at least one peripheral device of the vending machine;
   maintaining in a memory of an audit device, previously stored device data from the vending machine controller and the at least one peripheral device; and
   generating a merged audit record based on the comparison of the new device data and the previously stored device data from the vending machine controller and the at least one peripheral device, respectively,
   wherein a reference table stored in memory defines a priority between a priority of data groups, a priority of the vending machine controller, and a priority of the at least one peripheral device,
   entering an interim period in response to generation of the single audit record, and
   invalidating the single audit record in response to detecting an event that changes an accuracy of the single audit record during the interim period.

* * * * *